United States Patent [19]

Gibbs

[11] Patent Number: 4,651,339
[45] Date of Patent: Mar. 17, 1987

[54] MULTI-SUBSCRIBER WARNING SYSTEM

[76] Inventor: William L. Gibbs, 2123 E. Wornall Pl., Springfield, Mo. 65807

[21] Appl. No.: 747,268

[22] Filed: Jun. 21, 1985

[51] Int. Cl.$^4$ .................................. H04M 11/04
[52] U.S. Cl. .................................. 379/42; 379/418
[58] Field of Search ......... 179/5 P, 5 R, 2 A, 18 BG, 179/18 BH

[56] References Cited

U.S. PATENT DOCUMENTS

| | | | |
|---|---|---|---|
| 3,428,750 | 2/1969 | Hoffman | 179/5 R |
| 3,777,065 | 12/1973 | Galion et al. | 179/6 TA |
| 3,865,985 | 2/1975 | Stankus | 179/5 P |
| 4,041,242 | 8/1977 | Churchill | 179/2 A |
| 4,442,320 | 4/1984 | Jones et al. | 179/5 R |
| 4,521,643 | 6/1985 | Dupuis et al. | 179/2 DP |

*Primary Examiner*—Gene Z. Rubinson
*Assistant Examiner*—M. Connors
*Attorney, Agent, or Firm*—Rey Eilers

[57] ABSTRACT

A multi-subscriber warning system can, in instances where emergencies are impending, apply ringing current to the "ring" lines of one party systems, to the "ring" lines of "ring" two party systems, and to the "tip" lines of "tip" two party systems. Those ringing signals will actuate the "ringers" of all instruments which are not in use, and will cause a buzzing sound in the reproducers of all instruments which are in use. Further, if a subscriber hears the "ringers" and raises the receiver from the cradle, a buzzing sound will be heard; and then the ringing sound will resume when the receiver is placed on the cradle. Conversely, if a buzzing sound is heard by a subscriber using the instrument, a ringing sound will be heard when the instrument is placed on the cradle; and the buzzing sound will resume when the receiver is again removed from the cradle. The duration and number of ringing sounds can be varied; and preferably will be different from the normal ringing sounds used to "call" a subscriber.

8 Claims, 4 Drawing Figures

MULTI-SUBSCRIBER WARNING SYSTEM

SUMMARY OF THE INVENTION

It is important, in many instances, to alert large numbers of people in a very short period of time. In recognition of that fact, many communities have purchased and installed sirens which can be actuated to alert large numbers of people. Unfortunately, effectiveness tests of such sirens indicate that sirens are not always effective in alerting all of the people who should be alerted. In some instances, rain, hail or heavy winds tend to make it difficult for persons to hear the sirens. In other instances, the insulation in the walls and ceilings of houses and buildings, and the insulated doors and windows of houses and buildings, tend to keep the sirens from being heard. In still other instances, the sounds from radio sets, television sets and record or tape players tend to keep the occupants of the houses or buildings from hearing the sirens. Also, if the power supply for the sirens is interrupted, those sirens can not provide the required warning. As a result, warning systems which depend upon signals that must pass through the air for substantial distances, and then must additionally pass through the walls or roofs of houses and buildings, are objectionable. The multi-subscriber warning system provided by the present invention avoids those objections; and it does so by using the local telephone system to supply a warning. It is, therefore, an object of the present invention to provide a multi-subscriber warning system which utilizes the local telephone system to provide a warning.

The multi-subscriber warning system provided by the present invention is able to provide a warning, whether the subscribers are using their telephone instruments or are merely within earshot of those instruments. That warning system accomplishes that important result by supplying a ringing signal which will activate the "ringers" of all subscribers' instruments that are not in use, and which will supply an unmistakable warning signal to all subscribers' instruments that are in use. As a result, whether subscribers are using their telephone instruments or are merely within earshot of those instruments, they will receive the required warning. It is, therefore, an object of the present invention to provide a multi-subscriber warning system which will provide a warning to a large number of subscribers, whether those subscribers are using their telephone instruments or are merely within earshot of those instruments.

The multi-subscriber warning system provided by the present invention can be used with one party lines, can be used with "ring" two party lines, and also can be used with "tip" two party lines. When that warning system is used with a one party line, signals from a source of ringing current are applied to the "ring" conductor; and the return is through the "tip" conductor of that one party line. Where the warning system is used with a "ring" two party line, the ringing signal is applied to the "ring" conductor; and ground is used as the return conductor of that two party line. Where the warning system is used with a "tip" two party line, the ringing signal is applied to the "tip" conductor; and ground is used as the return conductor of that two-party line. Consequently, the multi-subscriber warning system provided by the present invention can be used to alert single party line subscribers, two party "tip" line subscribers and two party "ring" line subscribers, whether or not those subscribers are using their telephone instruments or are merely within earshot of those instruments. It is, therefore, an object of the present invention to provide a multi-subscriber warning system which can supply a warning to subscribers having one party, two party "tip" lines, and two party "ring" lines.

The multi-subscriber warning system provided by the present invention does not require any alterations in, modifications of, additions to, or deletions from the equipment already installed in the homes, or places of business, of subscribers. Instead, all of the equipment for that system is installed at the central offices of the telephone system. This is desirable in minimizing the cost of installation, in avoiding all need of entering the premises of subscribers, and in maintaining the warning equipment. It is, therefore, an object of the present invention to provide a multi-subscriber warning system which is installed wholly in the central offices of the telephone system, and which does not require any portions thereof to be added to, or substracted from, equipment already in the homes or places of business of subscribers.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

DETAILED DESCRIPTION OF PREFERRED EMBODIMENT

Figure 1:
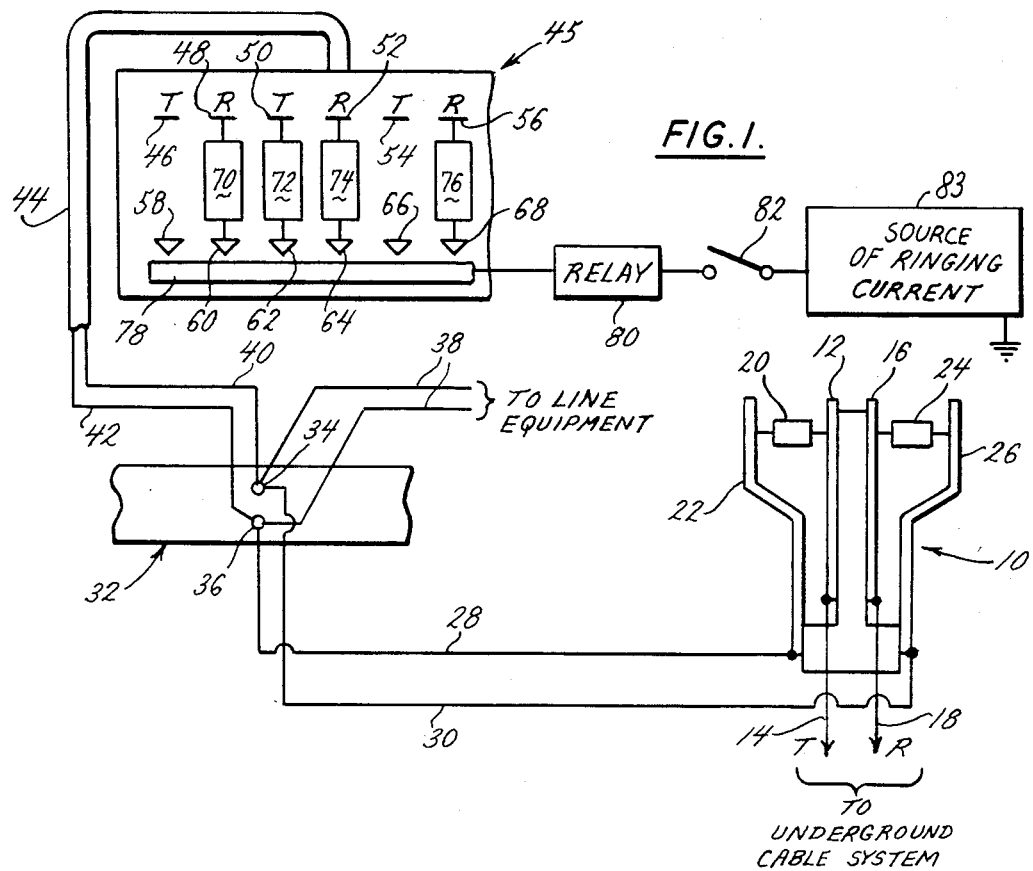
FIG. 1 is a schematic diagram of a circuit-closing unit of the warning system provided by the present invention, of part of a horizontal distribution frame, and of part of a vertical main frame of a telephone system with which that warning system is used.

The numeral 10 generally denotes a termination fixture on the vertical main frame in the central office of a telephone system. The numeral 12 denotes a fixed contact to which the "tip" line 14 is attached; and the numeral 16 denotes a stationary contact to which the "ring" line 18 is attached. Those lines extend to the underground cable system of the telephone company. The numeral 20 denotes a fuse or heat coil that is interposed between the contact 12 and a spring contact 22; and the numeral 24 denotes a similar fuse or heat coil which is interposed between the contact 16 and a spring contact 26. The termination fixture 10 will be just one of a multitude of termination fixtures on the vertical main frame in that central office.

The numeral 28 denotes a "tip" jumper wire which extends from the spring contact 22 to a "tip" lug 36 on a horizontal distribution frame 32 in the central office; and the numeral 30 denotes a "ring" jumper wire which extends from the spring contact 26 to a "ring" lug 34 on that horizontal distribution frame. A permanent pair of wires 38 extends from the "ring" and "tip" lugs 34 and 36 on that horizontal distribution frame to the line equipment in the central office which selects, and connects, the "calling" and "called" numbers of the telephone system.

There will be a multitude of "ring" and "tip" lugs on the horizontal distribution frame; and there will be a corresponding multitude of permanent pairs of wires 38. Those lugs, that horizontal distribution frame, those permanent pairs of wires, the vertical main frame, the jumper wires, and the termination fixtures are standard and usual parts of a telephone system; and they are not, per se, parts of the present invention. Moreover, those "ring" and "tip" lugs, that horizontal distribution frame, those permanent pairs of wires, that vertical main frame, those jumper wires, and those termination fixtures can be of any suitable design and manufacture; because the present invention will operate with those various components, regardless of their design and manufacture.

The numeral 40 denotes a "ring" wire which extends from the "ring" lug 34 to the corresponding "ring" contact of a circuit-closing unit which is generally denoted by the numeral 45; and the numeral 42 denotes a "tip" wire which extends from the "tip" lug 36 to the corresponding "tip" contact of that circuit-closing unit. The wires 40 and 42 will be just two of a large number of "ring" and "tip" wires which constitute parts of a multiple-paired cable 44 or parts of jumper wire groupings that extend from the horizontal distribution frame 32 to the circuit-closing unit 45; because each "tip" and "ring" lug on that horizontal distribution frame, which corresponds to a subscriber to the warning system, will have either a corresponding contact in that circuit-closing unit or in a similar circuit-closing unit.

The numerals 46 and 48 denote, respectively, a "tip" contact and a "ring" contact which are dedicated to a single party line; and the numerals 58 and 60 denote contacts which are normally open but which can be closed by a bridging contact 78 whenever a warning is to be given. Connector 70, which can be a fuse or a strap, is interposed between the "ring" contact 48 and the normally-open contact 60; because the "ring" conductors of single party lines are used to supply the warning signals to subscribers having such lines.

The numeral 50 denotes the "tip" contact and the numeral 52 denotes the "ring" contact of the conductors of a two party line; and the numerals 62 and 64 denote normally-open contacts which can be bridged by the bridging contact 78. A connector 72, which can be a fuse or a strap, is interposed between the "tip" contact 50 and the normally-open contact 62; and a connector 74, which can be a fuse or a strap, connects the "ring" contact 52 with the normally-open contact 64. The "tip" contact 50 will be connected to the "tip" conductor of the two party line; and the "ring" contact 52 will be connected to the "ring" conductor of that two party line.

The numeral 54 denotes the "tip" contact of a two party line, and the numeral 56 denotes the "ring" contact of that two party line. The numerals 66 and 68 denote normally-open contacts which correspond to the contacts 54 and 56. A connector 76, which may be a fuse or a heat coil, is connected between the "ring" contact 56 and the normally-open contact 68. The absence of a connector between the "tip" contact 54 and the contact 66 shows that the "tip" subscriber of that two party line did not choose to be a part of the multi-subscriber warning system.

Where, as shown by FIG. 1, the wires 40 and 42, and the corresponding wires for other lines, are connected to the spring contacts 22 and 26, and to similar contacts, of the termination fixtures, the connectors 70, 72, 74 and 76 can be straps; because the fuses or heat coils in those termination fixtures can provide the requisite protection against incoming surges. However, in the event the wires 40 and 42, and the corresponding wires for other lines were to be connected directly to the contacts 16 and 12, and to similar contacts, of the termination fixtures, or to the lugs which receive the "ring" and "tip" lines such as the lines 18 and 14, the connectors 70, 72, 74 and 76 would have to be fuses or heat coils to provide the requisite protection against incoming surges.

The numeral 80 denotes the coil of a relay which includes normally-open contacts 82 that are connected to a source of ringing current 83. That source will be comparable to the sources of ringing current which are commonly used in telephone systems; but it will be in addition to the sources of ringing current which are used daily in the operation of such systems. In addition, that source of ringing current will have sufficient capacity to supply ringing current to all of the single party lines, to all of the "tip" two party lines, and to all of the "ring" two party lines which are connected to the circuit-closing unit 45. Whenever a signal is applied to the relay coil 80, it will simultaneously close the contacts 82 and move the bridging contact 78 into engagement with all of the contacts 58, 60, 62, 64, 66 and 68 of the circuit-closing unit 45. Thereupon, ringing current, which will be an A.C. signal, will pass through now-closed contacts 82 and the moved bridging contact 78, contacts 60, 62, 64 and 68, and connectors 70, 72, 74 and 76 to the "ring" contacts 48, 52 and 56 and to the "tip" contact 50.

Figures 2, 3, 4:
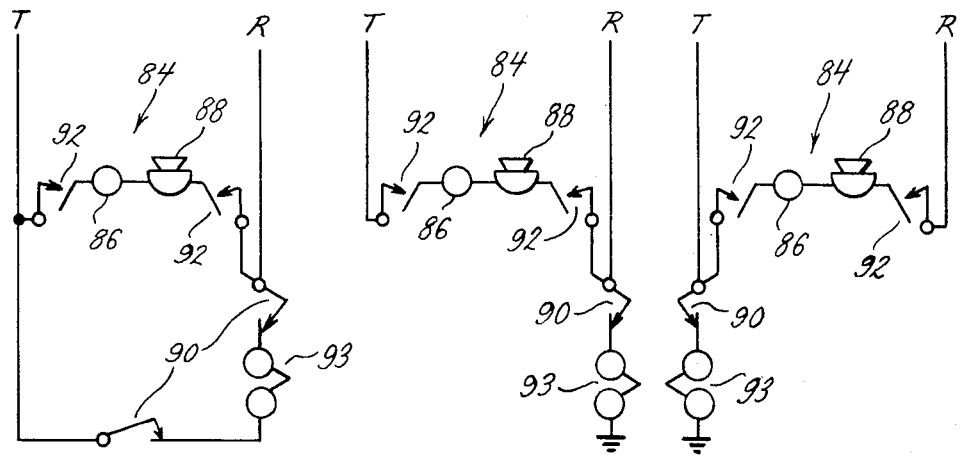
FIG. 2 is a schematic diagram of a telephone instrument connected for one party line service.
FIG. 3 is a schematic diagram of a telephone instrument connected for two party line "ring" service.
FIG. 4 is a schematic diagram of a telephone instrument connected for two party line "tip" service.

The numeral 84 in FIGS. 2–4 generally denotes a telephone instrument of standard and usual design; and that instrument has a reproducer 86, a microphone 88, normally-closed contacts 90, normally-open contacts 92, and "ringers" 93. As shown by FIG. 2, the "ringers" 93 are customarily connected across the "tip" conductor 14 and the "ring" conductor 18 by the normally-closed contacts 90. When the "receiver" is lifted or otherwise caused to open the contacts 90 and to close the contacts 92, the "ringers" 93 will become inactive; and the reproducer 86 and microphone 88 will become active—as occurs each time a telephone instrument is used.

In the event the telephone instrument 84 of a single party line is not in use, at a time when the warning system is actuated, the closing of the contact 60 by the bridging contact 78 will cause ringing current to pass from the source of ringing current through contacts 82, bridging contact 78, contact 60, connector 70, "ring" contact 48, "ring" conductor 40, "ring" lug 34, "ring" wire 30, contact 26, fuse 24, contact 16, "ring" line 18, and contacts 90 to the "ringers" 93 in FIG. 2. That current will continue through the other contacts 90, the "tip" line 14, contact 12 of termination fixture 10, fuse 20, spring contact 22, "tip" wire 28, "tip" lug 36, the "tip" 38, and the central office equipment to the source of ringing current. That ringing current can be continued for any desired length of time; and it will preferably be continued for a period of time which is substantially longer than the less-than-five second periods that are customarily used in actuating the "ringers" of telephone systems. The resulting prolonged sound from the "ringers" 93 of the telephone instrument 84 will alert the nearby subscriber to the fact that an emergency situation is imminent. If the subscriber removes the receiver from the cradle of that telephone instrument, a buzzing sound will be heard from the reproducer 86; and that buzzing sound will be so distinctively different from the usual dial tone that the subscriber will know that an emergency situation exists. Moreover, when the subscriber replaces the receiver on the cradle, the "ringers" 93 will again produce the ringing sound. Having been alerted by the prolonged ringing sound, by the buzzing sound, and by the resumption of the prolonged ringing sound, the subscriber should take precautionary action; including the turning on of a radio to determine the exact nature, and possible timing, of the emergency.

In the event the telephone instrument 84 had been in use, at the time the relay coil 80 was actuated, the ringing current would have passed through the then-closed contacts 92, the microphone 88 and the reproducer 86, and then back through the "tip" conductor 14. The resulting buzzing sound would have been distinctively different from the usual dial tone, and hence the user of the telephone instrument should have been alerted to the fact that an emergency situation existed. Also, if that subscriber had placed the receiver on the cradle, the "ringers" 93 would have produced a prolonged ringing sound. If that subscriber had thereafter removed the receiver from the cradle, the buzzing sound would have again been audible. Having been alerted by the buzzing sound, by the succeeding prolonged ringing sound, and possibly by the resumption of the buzzing sound, the subscriber should take precautionary action; including the turning on of a radio to determine the nature, and possibly the timing, of the emergency. All of this means that whether a single party line is being used or is being inactive, the actuation of the relay coil 80 will cause the telephone instrument to provide a distinctive warning signal which will alert a user of that instrument, or a person nearby, to the existence of a potential emergency.

FIG. 3 shows how the telephone instrument 84 of FIG. 2 is connected when it is used on a "ring" two party line. The connections of the normally-open switches 92, of the reproducer 86, and of the microphone 88 are the same as in the one party line arrangement shown in FIG. 2. However, the normally-closed contacts 90 which are connected to the "tip" line 14 in FIG. 2 are not used. Instead, the "ringers" 93 are returned to the central office of the telephone company by having one terminal thereof connected to ground. The other terminal of those "ringers" is connected to the "ring" line 18 by the normally-closed switch 90.

The actuation of the relay coil 80 will cause ringing current to pass from the source of ringing current through contacts 82, briding contact 78, contact 64, connector 74, "ring" contact 52, one of the "ring" conductors in the cable or jumper wire grouping 44, one of the "ring" lugs, one of the "ring" wires, one of the spring contacts, one of the fuses, one of the contacts like contact 16, the appropriate "ring" wire 18, contacts 90, and the "ringers" 93 to ground. That current will be returned to the central office through the ground, and thence to the source of the ringing current. The resulting prolonged ringing of those "ringers" will provide the exact same kind of warning that the prolonged ringing of the "ringers"93 of FIG. 2 provided. If the receiver had been off of its cradle, the ringing current would have passed through contacts 92, microphone 88 and reproducer 86, the other contacts 92, and then would have passed to the source of the ringing current via the "tip" line 14. The resulting buzzing sound would have provided the exact same kind of warning that the buzzing sound from the reproducer 86 of FIG. 2 provided. All of this means that the subscriber of a "ring" two party line will receive the exact same kind of warning that the single party subscriber receive in the foregoing illustration of the operation of the warning system. Consequently, that subscriber should take precautionary action; including the turning on of a radio to determine the exact nature, and possible timing, of the emergency.

FIG. 4 shows how the telephone instrument 84 of FIG. 2 is connected when it is used on a "tip" two party line. The connections of the normally-open switches 92, of the reproducer 86, and of microphone 88 are the same as in FIGS. 2 and 3. However, the "ringers" 93 have one terminal thereof connected to ground, and have the other terminal thereof connected to the "tip" line 14 by the normally-closed contacts 90.

The actuation of the relay coil 80 will cause ringing current to pass from the source of ringing current through contacts 82, briding contact 78, contact 62, connector 72, "tip" contact 50, one of the "tip" conductors in the cable or jumper wire grouping 44, one of the "tip" lugs, one of the "tip" wires, one of the spring contacts, one of the fuses, one of the contacts like contact 12, the appropriate "tip" wire 14, contacts 90, and the "ringers" 93 to ground. That current will be returned to the central office through the ground and thence to the source of the ringing current. The resulting prolonged ringing of those "ringers" will provide the exact same kind of warning that the prolonged ringing of the "ringers" 93 of FIG. 2 provided. If the receiver had been off of its cradle, the ringing current would have passed through contacts 92, microphone 88 and reproducer 86, the other contacts 92, and then would have passed to the source of the ringing current via the "ring" line 18. The resulting buzzing sound would have provided the exact same kind of warning that the buzzing sound from the reproducer 86 of FIG. 2 provided. All of this means that the subscriber of a "tip" two party line will receive the exact same kind of warning that the single party subscriber and the "ring" two party line subscriber receive. Consequently, that subscriber should take precautionary action; including the turning on of a radio to determine the exact nature, and possible timing, of the emergency.

If at the time the relay coil 80 had been energized, the receivers of both the "ring" and "tip" instruments 84 on the two party line had been off the cradles, buzzing sounds would have been produced by the reproducers 86 of both of those instruments. When the subscribers thereafter placed those receivers on the cradles, the "ringers" of both instruments would have provided prolonged ringing sounds. Moreover, those instruments would have again provided the buzzing sounds if the receivers had again been removed from the cradles. Consequently, clear and unmistakable warnings will be supplied simultaneously to the subscribers of a two party line, whether neither instrument is in use, whether either of those instruments is in use, or whether both instruments are in use.

The connector 76 of FIG. 1 indicates that only the "ring" line subscriber, of a two party line, has subscribed to the warning system. No connector will be provided for any subscriber who does not wish to take advantage of the warning system; and, in such event, the normally-open contacts of that subscriber, as for example the contact 66 in FIG. 1, will be inactive at all times. Specifically, as long as the relay coil 80 is de-energized, the contact 66 will be inactive; and, even when that relay coil is energized, that contact will be inactive —because no connector is interposed between that contact and the "tip" contact 54. The operation of the instrument on the "ring" two party line that is connected to the "ring" contact 56 will be the same as the previously-described operation of the instrument on the "ring" two party line that is connected to the "ring" contact 52.

The maximum number of normally-open contacts on any one of the circuit-closing units 45 will be determined by the ringing capacity of the source of ringing current connected to that unit. For convenience, the various circuit-closing units will be mounted immediately below the horizontal distribution panels which bear the "tip" and "ring" lugs of the single party and two party lines that are to be connected to those circuit-closing units.

To include a subscriber in the warning system, it is only necessary to interpose a connector between the normally-open contacts and the "ring" or "tip" contact corresponding to that subscriber on the appropriate circuit-closing unit. Conversely, to remove a subscriber from the warning system, it is only necessary to remove the connector corresponding to that subscriber. This means that by merely inserting or removing a single connector, the service can be supplied to or removed from a subscriber as the subscriber desires.

The sources of the ringing current will be connected to the emergency power system of the telephone company as well as to the normal power system of the community. As a result, the sources of ringing current will be able to supply the requisite warnings to subscribers even if the power supply of the community is interrupted.

The durations, and numbers, of ringing sequences can be controlled. Usually, it will be desirable to provide a longer duration ringing time than is normally provided when a subscriber's number is "called", because that longer duration ringing time would indicate to a subscriber that an emergency was impending without requiring that subscriber to reach the telephone instrument and lift the receiver. However, even if the duration and number of rings supplied by a warning system were the same as the duration and number of rings provided when a subscriber is "called", the subscriber would immediately recognize that an emergency was impending when the buzzing sound was heard as the receiver was lifted, and when the ringing was resumed as the receiver was replaced on the cradle.

To keep the warning system from overloading the sources of power for the sources of ringing current, the ringing currents can be supplied to the circuit-closing units in "waves". Specifically, at one instant, ringing currents will be supplied to one group of circuit-closing units, and then a second or two later ringing current will be supplied to a further group of circuit-closing units. After a further second or two, ringing current will be supplied to a still further group of circuit-closing units. The capacities of the sources of ringing current will, of course, have to be great enough to permit large numbers of those sources of ringing current to be in operation at the same time; so the first warning can be supplied to all subscribers of the multi-subscriber warning system within a matter of a few seconds.

FIGS. 2 through 4 emphasize the fact that no additions to, changes in, deletions from, or modifications to the telephone instrument in a subscriber's home or place of business are required. The circuit-closing units and the connections thereto are installed in the central office of the telephone company; and the connections to those circuit-closing units do not require more than a momentary interruption of a subscriber's service. Importantly, those connections do not entail a visit to the subscriber's home or place of business.

In FIG. 1, the relay coil 80, the normally-open contacts 82, the contacts 58, 60, 62, 64, 66 and 68, and the bridging contact 78 are shown for simplicity and convenience. Such a coil and such switches and contacts will ordinarily be used only in very small telephone systems. With larger systems, solid state switching chips and circuits will be used. For example, where the various "tip" and "ring" wires were connected to the spring contacts, as shown in FIG. 1, silicon controlled switches or switching transistors could be used to replace the contacts 46, 48, 50, 52, 54, 56, 58, 60, 62, 64, 66 and 68, to replace the connectors 70, 72, 74 and 76, and to replace the coil 80 and the briding contact 78. The output of the source of ringing current would be connected to the appropriate power terminals of the SCSs or transistors, and a signal would be applied to the gates of the SCSs or to the bases of the transistors whenever a warning signal was to be supplied to the subscribers of the telephone system. The advantages to be gained by using solid state switching equipment instead of a relay, connectors and contacts are the same advantages of size, avoidance of contact corrosion, and low power of operation which customarily are associated with the use of solid state equipment.

Whereas the drawing and accompanying description have shown and described a preferred embodiment of the present invention it should be apparent to those skilled in the art that various changes may be made in the form of the invention without affecting the scope thereof.

What I claim is:

1. A multi-subscriber warning system which utilizes the line pairs and instruments of a telephone system to provide a warning to subscribers whether those subscribers are using, or are merely within earshot of, their telephone instruments and which does not, at any time, interrupt or interfere with the normal continuous connections of said line pairs to the line equipment of said telephone system and which comprises a source of ringing current, a plurality of contacts that are connected to the ring-initiating conductors of said line pairs to serve as signal-injecting contacts for said ring-initiating conductors, a manually-set, subscriber-selecting, connecting means that is connected to said plurality of contacts to select predetermined contacts of said plurality of contacts through which said source of ringing current can supply a warning to the line pairs to which said predetermined contacts are connected, means that normally isolates said manually-set, subscriber-selecting, connecting means, and hence said predetermined contacts of said plurality of contacts, from said source of ringing current to normally keep said predetermined contacts from passing current and also to normally keep said predetermined contacts from having a detectable effect upon the operation of said telephone system, and said isolating means selectively connecting said source of ringing current to said predetermined contacts of said plurality of contacts via said manually-set, subscriber-selecting, connecting means and thereby connecting said source of ringing current to said ring-initiating conductors of said selected, predetermined line pairs to enable said source of ringing current to create a warning sound in the receivers of the telephone instruments that are connected to said selected, predetermined line pairs and that are in use and to actuate the "ringers" of the telephone instruments which are connected to said selected, predetermined line pairs and which are not then in use.

2. A multi-subscriber warning system as claimed in claim 1 wherein said telephone system has a distribution panel where conductors are appropriately connected together, wherein said manually-set, subscriber-selecting, connecting means is mounted on said distribution panel, and wherein said predetermined contacts of said plurality of contacts are connected to some of said conductors.

3. A multi-subscriber warning system as claimed in claim 1 wherein said isolating means is controlled within a building of a telephone company and is controlled by an employee of said telephone company.

4. A multi-subscriber warning system as claimed in claim 1 wherein all of said telephone instruments are adapted to have the ringers thereof actuated by one predetermined frequency, and wherein said source of ringing current supplies said one predetermined frequency.

5. A multi-subscriber warning system as claimed in claim 1 wherein said manually-set, subscriber-selecting, connecting means includes spaced-apart contacts and selectively-removable connectors that removably interconnect said spaced-apart contacts.

6. A multi-subscriber warning system as claimed in claim 1 wherein said isolating means connects said source of ringing current to a multiplicity of line pairs at substantially the same instant.

7. A multi-subscriber warning system as claimed in claim 1 wherein said isolating means connects said source of ringing current to a multiplicity of line pairs at substantially the same instant, wherein all of said telephone instruments are adapted to have the ringers thereof actuated by one predetermined frequency, and wherein said source of ringing current supplies said one predetermined frequency.

8. A multi-subscriber warning system as claimed in claim 1 wherein said telephone system has a distribution panel where conductors are appropriately connected together, wherein said manually-set, subscriber-selecting, connecting means is mounted on said distribution panel, wherein said predetermined contacts of said plurality of contacts are connected to some of said conductors, and wherein said manually-set, subscriber-selecting connecting means includes spaced-apart contacts and selectively-removable connectors that removably interconnect said spaced-apart contacts.

* * * * *